United States Patent [19]
Yamakawa et al.

[11] Patent Number: 5,385,046
[45] Date of Patent: Jan. 31, 1995

[54] GAS FLOW TYPE ANGULAR VELOCITY SENSOR

[75] Inventors: Hiroshi Yamakawa; Masayuki Ikegami; Tsuyoshi Hano, all of Saitama, Japan

[73] Assignee: Honda Giken Kogyo Kabushiki Kaisha, Tokyo, Japan

[21] Appl. No.: 40,937

[22] Filed: Mar. 31, 1993

[30] Foreign Application Priority Data

Apr. 10, 1992 [JP] Japan .................. 4-135536
Apr. 20, 1992 [JP] Japan .................. 4-144731

[51] Int. Cl.⁶ ............................................ G01P 9/00
[52] U.S. Cl. .......................... 73/516 LM; 73/204.22
[58] Field of Search ............... 73/516 LM, 505, 497, 73/204.11, 204.16, 204.22, 204.23, 204.25

[56] References Cited

U.S. PATENT DOCUMENTS 4,295,373 10/1981 Moffatt ........................... 73/505
4,408,490 11/1983 Takahashi et al. ......... 73/516 LM
4,531,123 7/1985 Tagami et al. ............. 73/516 LM
4,584,878 4/1986 Katsuno ..................... 73/516 LM
5,107,707 4/1992 Takahashi et al. ......... 73/516 LM

FOREIGN PATENT DOCUMENTS 644623 1/1989 Japan .
329858 3/1991 Japan .

*Primary Examiner*—Hezron E. Williams
*Assistant Examiner*—Helen C. Kwok
*Attorney, Agent, or Firm*—Lyon & Lyon

[57] ABSTRACT

An angular velocity sensor of the type wherein a flow of gas forced by a pump into a gas path in the sensor body through a nozzle hole and directed toward a pair of thermosensitive resistance elements provided in the gas path is deflected by the action of an angular velocity and the deflection of the gas flow is sensed by the thermosensitive resistance elements, and which is further provided with a thermostatically-controlled gas path which is heated in order to maintain the gas flow at a constant temperature to avoid the effect of ambient temperature variations. The sensor also is provided with a gas path for absorbing pulsations of the gas flow caused by pumping operations.

15 Claims, 6 Drawing Sheets

GAS FLOW TYPE ANGULAR VELOCITY SENSOR

BACKGROUND OF THE INVENTION

The present invention relates to a gas flow type angular velocity sensor which is capable of electrically sensing a deflection of a gas flow, which is caused by the action of an angular velocity applied to the sensor body.

Japanese laid open patent publication No. 4623/89 describes such a gas flow type angular velocity sensor in which gas is forced into a gas path in the sensor body through a nozzle hole to flow therealong toward a pair of heat wires, each being composed of a thermo-sensitive resistance element. When an angular velocity is applied to the sensor body, the gas flow is deflected and, accordingly, a difference between thermosensitive outputs of two heat wires is produced and picked up for determining therefrom a direction and a magnitude of the angular velocity acting on the sensor body.

Since the above-mentioned angular velocity sensor is designed to determine an angular velocity by sensing a very small differential change of heat radiation of two heat wires (i.e., thermosensitive resistances), temperature variation of the gas flow may affect the detecting accuracy of the sensor. For this reason, the conventional gas flow type sensor is mounted in a fixed temperature case capable of keeping temperature therein at a constant level to avoid the effect of ambient temperature variations.

Recently, there has been also developed a gas rate sensor of the type that has its body portion composed of a gas path and the pair of heat wires therein are manufactured by semiconductor micro-machining on the basis of IC technology. This is disclosed in Japanese laid open patent publication No. 29858/92.

However, in contrast to a conventional gas rate sensor having a gas path of relatively large volume to absorb pulsation and fluctuation of the gas flow produced by a pump that alternately sucks and exhausts gas, a gas rate sensor having a gas path of relatively small volume can not absorb the above-mentioned pulsation or fluctuation of the gas flow, which appears as a noise component in the sensor's output. This results in lowering the accuracy of angular velocity measurement.

The above-mentioned prior art devices have the following problems to be solved:

1) The first problem is that the fixed temperature case containing a sensor body requires the provision of heating means of relatively large output power so as to evenly heat up the inner space of the fixed temperature case. It also takes time to heat up the fixed temperature case until its inside temperature rises to a constant level, at which the sensor can accurately measure an angular velocity. Furthermore, the response of the fixed temperature case temperature control is somewhat insufficient to prevent the possible effects of ambient temperature variations.

2) The second problem arising in using a small-sized sensor having a reduced volume of a gas path is that pulsing gas flows created by pumping operations can not be absorbed in the normal gas path and produce noise components which may be induced into outputs of the sensor.

SUMMARY OF THE INVENTION

On the basis of the fact that a gas flow type angular velocity sensor not mounted in a fixed temperature case can accurately sense a deflection of a gas flow therein by-use of thermo-sensitive elements if the gas forced into the gas path in the sensor body through a nozzle hole could be always kept at a constant temperature, the applicant has developed such a gas flow type angular velocity sensor that is provided at the up stream side of its nozzle portion with a thermostatically-controlled gas path with a wall which is evenly heated and kept at a constant temperature.

The applicant has also proposed a gas flow type angular velocity sensor wherein a pump and a gas path are communicated with each other by means of, for example, a bent path or a path having a plurality of internally formed fins for damping a pulsation flow of gas supplied by the pump.

DESCRIPTION OF THE PREFERRED EMBODIMENTS

Embodiments of the present invention will be now described by way of examples and with reference to the accompanying drawings.

Figure 1:
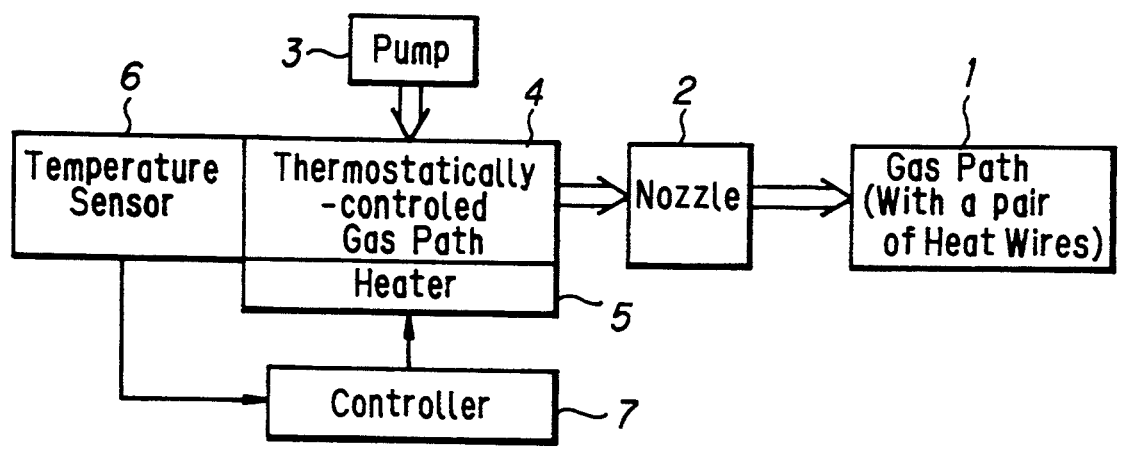
FIG. 1 is a block diagram showing a structure of a gas flow type angular velocity sensor embodying the present invention.

FIG. 1 shows a structure of a gas flow type angular velocity sensor according to the present invention, which sensor includes a nozzle portion 2 and a gas path 1 with a pair of heat wires arranged therein and is further provided with a thermostatically-controlled gas path 4 which is directly connected at one end to the up stream side of the nozzle portion 2 and at the other end to a gas-feeding pump 3. This thermostatically-controlled gas path 4 is provided with a heater 5 for heating the wall thereof, a temperature sensor 6 for measuring an actual wall temperature and a controller 7 for turning on and off the heating power supply to the heater 5 to actually maintain the wall temperature at the constant value, The sensor having this thermostatically-controlled gas path 4 of suitably selected length can realize that gas discharged from the pump 3 enters into the thermostatically-controlled gas path 4 and flows therealong, being heated by the heating wall surface; the gas temperature is raised to about the same temperature as that of heating wall at the exit thereof and then enters into the gas path 1 through the nozzle 2. This assures that gas is always regulated at a constant temperature before entering into the gas path of the sensor body.

Figure 2:
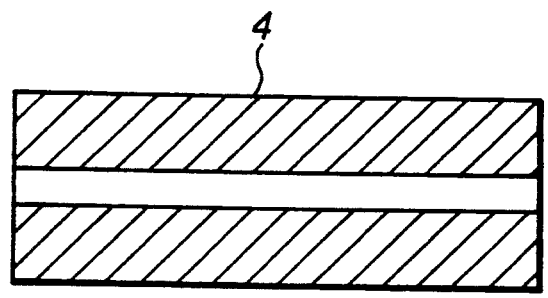
FIG. 2 is a cross-sectional plan view showing an example of a thermostatically-controlled gas path.

FIG. 2 shows a straight form of a thermostatically-controlled gas path formed integrally within a block structure 4, which is simple but must have a large length in order to heat the gas flow therein to a constant exit temperature.

Figure 3:
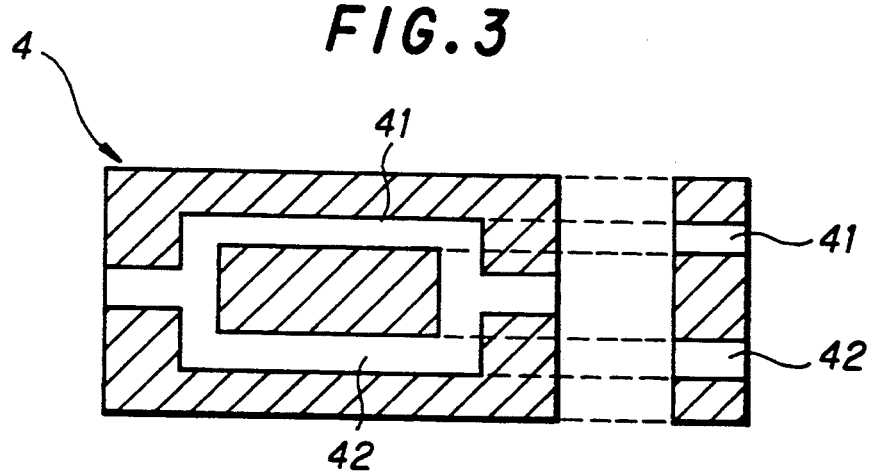
FIG. 3 is a view, partly in cross-sectional plan and partly in vertical cross-section, of another example of a thermostatically-controlled gas path.

Accordingly, there is shown in FIG. 3, an alternate embodiment of a thermostatically-controlled gas path having a plurality of branches (two branches in the shown case) 41 an 42, respectively, which formed integrally within block 4. This embodiment has an increased efficiency for heating the gas flow therein and a shorter length than the gas path shown in FIG. 2. A sensor of a reduced size is easy to mount in a smaller space.

Figure 4:
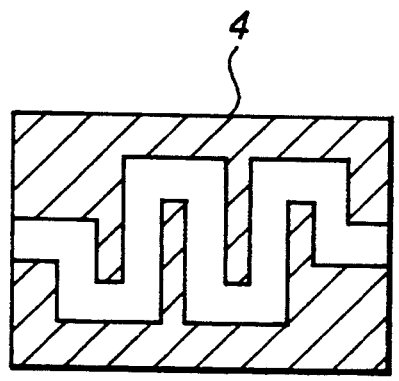
FIG. 4 is a cross-sectional plan view showing another example of a thermostatically-controlled gas path.

In FIG. 4, there is shown a further shortened thermostatically-controlled gas path in block 4 in which a thermostatically-controlled gas path is made in the bent form. In this case, the gas heating efficiency is especially improved because a turbulent gas flow is produced at each turn of the bent gas path 4, which is accordingly shortened in length.

Figure 5:
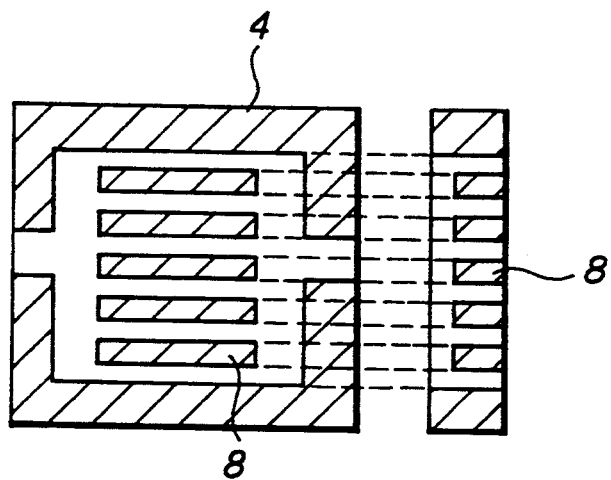
FIG. 5 is a view, partly in cross-sectional plan and partly in vertical cross-section, of a further example of a thermostatically-controlled gas path.

FIG. 5 shows another example of a thermostatically-controlled gas path in block 4, having a plurality of inwardly projecting fins 8, which can increase the gas heating efficiency and therefore result in further shortening of the gas path.

Figure 6:
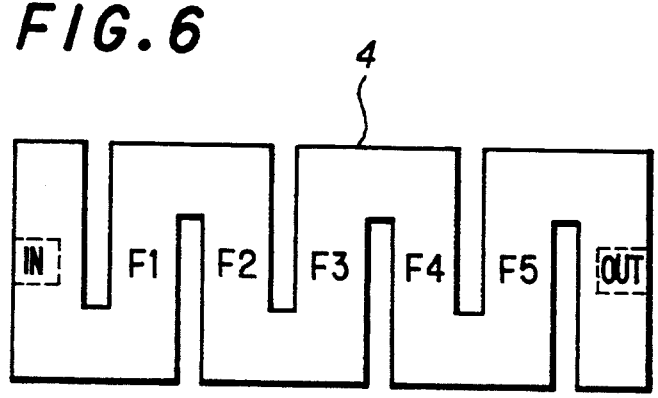
FIG. 6 is a cross-sectional plan view showing another example of a thermostatically-controlled gas path.

FIG. 6 shows a thermostatically-controlled gas path 4 having a bent form and having an inlet and an outlet both integrally formed in upper wall portions of a thermostatically-controlled block (not shown).

Figure 7:
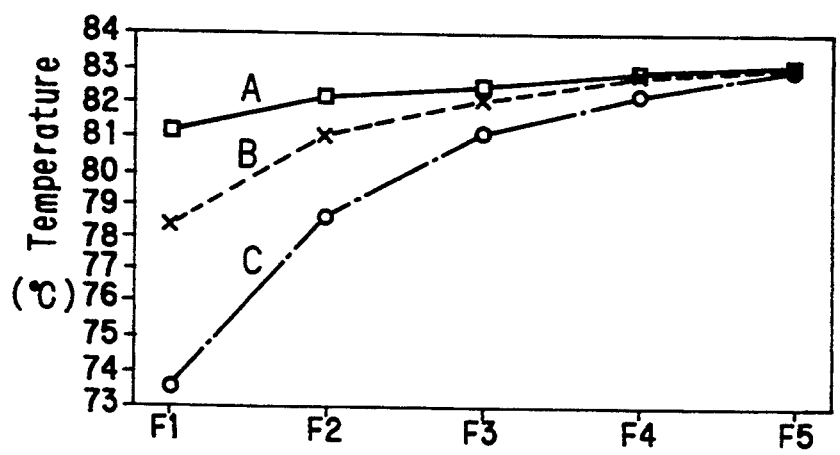
FIG. 7 is a temperature characteristic diagram of gas flow measured at control positions of the thermostatically-controlled gas path shown in FIG. 6.

FIG. 7 shows the results of temperature measurements taken at points F1–F5 along gas path 4 of FIG. 6, when nitrogen gas of about 23 degrees C. was made to flow through the gas path while the internal walls of the block were maintained at a temperature of 83 degrees C. In FIG. 2, curves A, B and C represent characteristics obtained at gas flows of 50, 100 and 200 SCCM (Standard Cubic Centimeter Per Minute) respectively. In every case, the gas temperature measured at point F5 near to the outlet (OUT) is about the same as that of the wall of the thermostatically-controlled bent gas-path.

When a gas flow is evenly distributed to "n" branches of a thermostatically-controlled gas path as shown in FIG. 3, each branch may be of 1/n in length for allowing 1/n of gas to flow therethrough. Accordingly, the resistance to the gas flow in full length of the gas path is reduced to a very small value of about $1/n^2$. This makes it possible to reduce discharging pressure of the pump 3 necessary for feeding the gas into the thermostatically-controlled gas path.

The thermostatically-controlled gas path 4 having a plurality of inwardly projecting fins 8 as shown in FIG. 5 may also have the same advantage as mentioned above.

Figure 8:
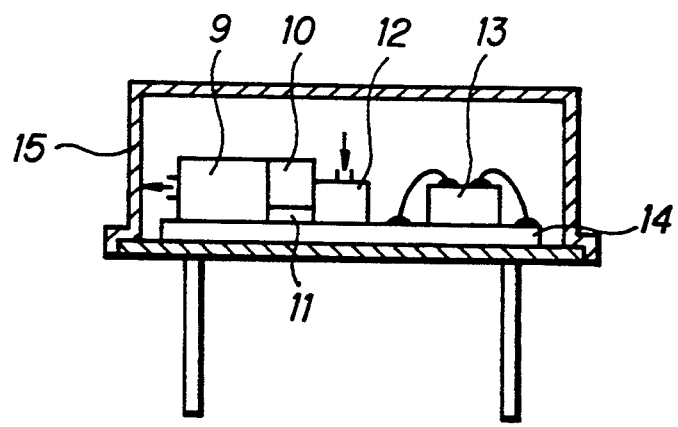
FIG. 8 is a sectional front view of a gas flow type angular velocity sensor embodying the present invention.

FIG. 8 shows an embodiment of a gas flow type angular velocity sensor which is composed of semiconductor substrates manufactured by use of micro-machining technology.

In FIG. 8, the angular velocity sensor comprises a sensor body 9 for detecting the deflection of a gas flow forced into a gas path through a nozzle portion by the use of a pair of heat wires arranged in the gas path; a thermostatically-controlled gas path 10 made within a semiconductor substrate by use of micro-machining technology, which is provided at its bottom with a heater substrate 11 and is directly connected to the nozzle portion of the sensor body; a miniature pump 12 for supplying gas into the thermostatically-controlled gas path 10; an IC chip 13 which includes an angular velocity detecting circuit, a detecting signal amplifier circuit and a heater drive control circuit for driving the heater substrate 11 so as to maintain the wall temperature of the thermostatically-controlled gas path 10 at a constant value by regulating the wall temperature measured by a temperature sensor (not shown); a ceramic substrate 14 with wiring patterns formed thereon for mounting all above-mentioned components at predetermined positions thereon; and a can-type package which contains the ceramic substrate 14 with all of the components installed thereon and is filled with gas medium such as helium, nitrogen or the like. In the can-type package 15, the miniature pump 12 intakes gas from the inner open space of the package 15 and feeds it into the sensor body 9 through the thermostatically-controlled gas path 10 to create a circulation of gas medium. This produces thermally stabilized gas flow to the sensor body.

Figure 9:
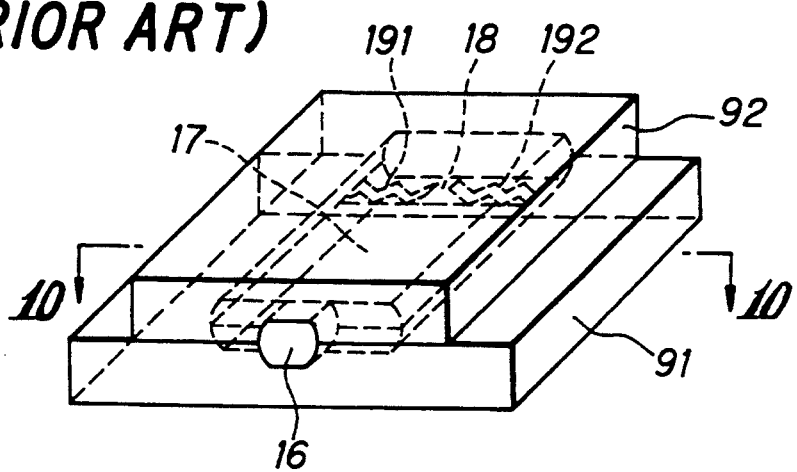
FIG. 9 is a perspective view of a body of a gas flow type angular velocity sensor.
Figure 10:
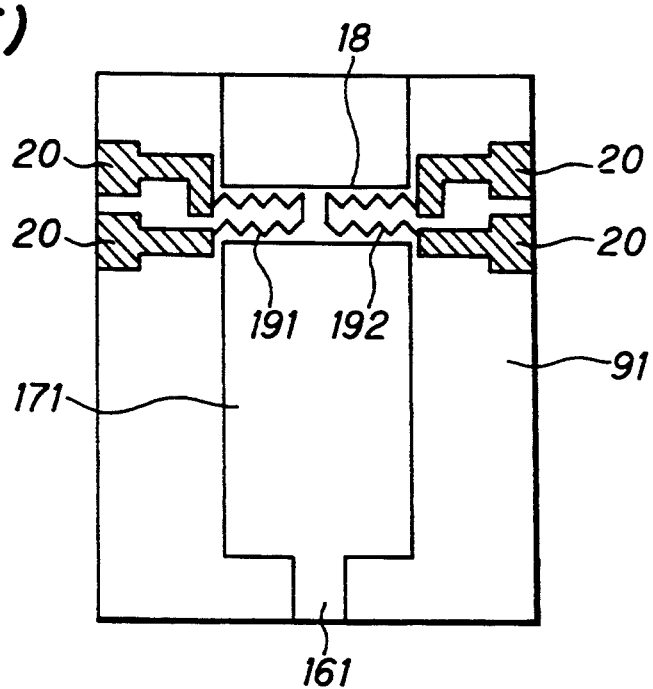
FIG. 10 is a plan view of the lower semiconductor substrate of the sensor body shown in FIG. 9.
Figure 11:
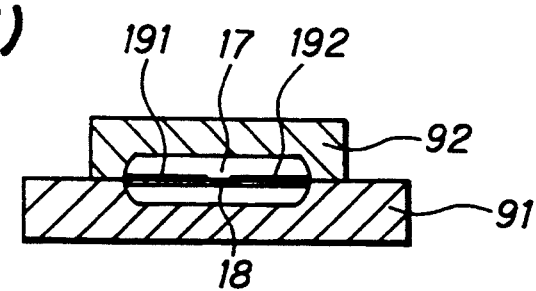
FIG. 11 is a sectional view taken along the plane A—A of FIG. 9.

Referring now to FIGS. 9–11, an example of a sensor body 9 formed on semiconductor substrates by using micro-machining technology will be described in detail.

The sensor body is constructed in such a way that a lower semiconductor substrate 91 having a half nozzle hole 161 and a half groove 171 etched thereon, and an upper semiconductor substrate 92 having a half nozzle hole (unnumbered) and a half groove (unnumbered) etched thereon that match hole 161 and groove 171, respectively. The upper and lower semiconductor substrates 91 and 92 are joined with each other so as to make both half holes and half grooves matched to form a nozzle 16 and a gas path 17 in the sensor body.

The lower semiconductor substrate 91 also has a bridge portion 18 etched thereon across the etched half groove 171 of the gas path 17. A pair of heat wires 191 and 192 are formed by pattern etching of a layer of heat wire material e.g. , platinum) deposited on the bridge portion 18, and electrodes 20 are formed by a like method, with one electrode 20 at each side of the paired heat wires.

The thermostatically-controlled gas path 10 of FIG. 8 is constructed in a similar manner such that a lower semiconductor substrate having a half groove etched thereon and an upper semiconductor substrate having a half groove etched thereon are joined together with their half grooves matched to form the gas path 10 of FIG. 8 in the shape of any of the gas paths 4 shown in FIGS. 2-6.

It is to be understood that the above-described embodiments of the invention is applied not only to a gas flow type angular velocity sensors formed on semiconductor substrates by a micro-machining method but also to gas flow type angular velocity sensors manufactured by general machining methods.

Figure 12:
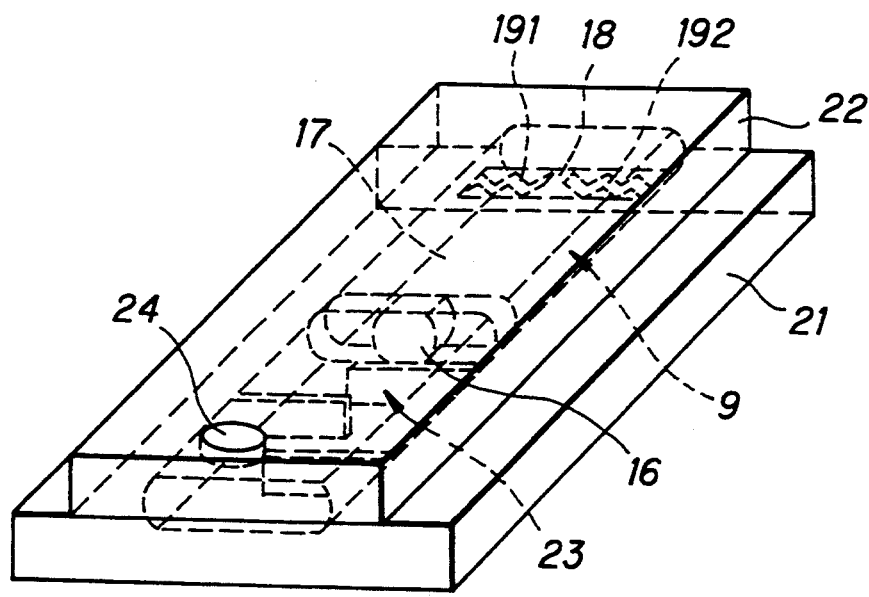
FIG. 12 is a perspective view of a angular velocity sensor body incorporating an integrally there in made thermostatically-controlled gas path of bent form.
Figure 13:
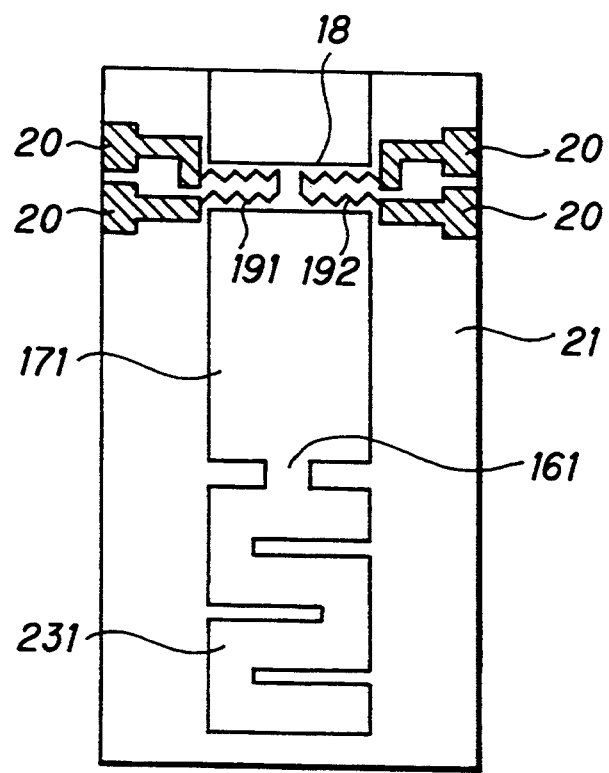
FIG. 13 is a plan view of the lower semiconductor substrate of the sensor body shown in FIG. 12

FIGS. 12 and 13 show an example of a gas flow type angular velocity sensor wherein a bent gas-path 23 for damping a pulsing gas flow is formed integrally with a sensor body 9 on semiconductors by micro-machining technology.

A lower and an upper semiconductor substrates 21 and 22, each of which has an etched half hole 161 of a nozzle hole 16, an etched half groove 171 of a gas path 17 and an etched half groove 231 of a bent path 23, are joined together so as to precisely form the nozzle 16, the gas path 17 and the bent path 23 in one integral unit.

The upper semiconductor substrate 22 has an upper inlet hole 24 for introducing gas into the bent path 23.

The lower semiconductor substrate 21 also has an etched bridge portion 18 across the etched half groove 171 of the gas path 17. A pair of heat wires 191 and 192 are formed by pattern etching of a layer of heat wire material (e.g., platinum) deposited on the bridge portion 18, and electrodes 20 are formed by a like method with one electrode at each side of the paired heat wires.

Figure 14:
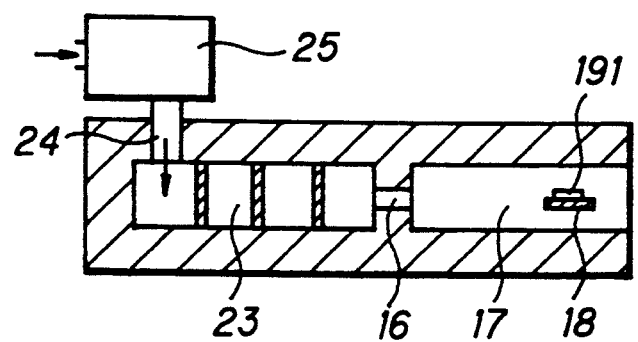
FIG. 14 is a sectional side view showing a bent gas-path with a miniature pump connected thereto.

FIG. 14 shows an embodiment of a gas flow type angular velocity sensor wherein a miniature pump 25 being drivable by a piezoelectric element is directly connected at its discharge port to an inlet port of a bent gas path 23 integrally formed in a sensor body 9 so as to supply gas (e.g., helium) into the bent path. The gas is supplied by the miniature pump 25 into the bent gas path 23 wherein the gas flow is damped enough to eliminate noise components such as pulsation flows due to pumping operations, and then a stabilized flow is injected into the gas path 17 of the sensor body 9.

Figure 15:
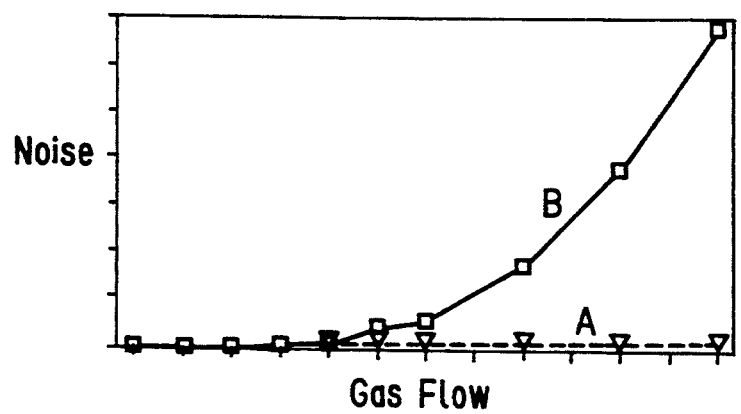
FIG. 15 is a characteristic diagram showing results of measurements of noise components included in outputs of sensors, one having a bent gas-path and other having no bent gas-path.

FIG. 15 is a characteristic diagram showing results of measurements of noise components included in outputs of sensors, one having a bent path (curve A) and other having no bent path (curve B). As apparent from the diagram, the provision of the bent path 23 can effectively reduce noise components in the sensor outputs.

It is, of course, possible to separately form the sensor body 9 and the bent path 23 and then join them together.

Figure 16:
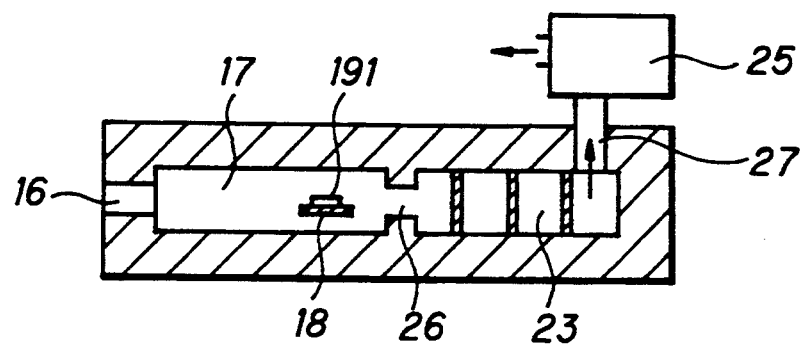
FIG. 16 is a sectional side view showing a bent gas-path with a miniature pump connected thereto in another embodiment of the present invention.

As shown in FIG. 16, it is also possible to produce a stabilized gas flow without pulsation or similar noise components in a gas path 17 by providing a bent path 23 at a gas outlet 26 of the gas path 17 (not at nozzle side 16) and directly connecting its outlet 27 to a suction port of a miniature pump 25 by which gas is drawn out from the bent path 23 and discharged into an open loop of gas circulation.

In both embodiments illustrated in FIGS. 14 and 16 the miniature pump 25 is installed at the upper wall surface of the bent gas-path 23. However, it is to be understood that the bent path 23 may have its outlet or inlet opening at any side or bottom wall surface on which it is desired to install the miniature pump 25.

The provision of a gas path in a block having a plurality of inwardly projecting fins (not shown) is also effective to damper pulsing gas flows produced by pumping operations, This assures a stabilized gas flow into the gas path in the sensor body.

As is apparent from the foregoing description, the gas flow type angular velocity sensor according to the present invention offers such an advantage that a thermostatically-controlled gas path provided at the up stream side of a nozzle portion of the sensor body is capable of maintaining its wall temperature at a constant level through a heater control whereby, the gas may be heated therein to a constant temperature and then enter into the sensor body through the nozzle, thereby eliminating the necessity of heating the sensor body. The gas flow is quickly heated up to the constant temperature by use of relatively simple heating means that may have a relatively small heat capacity and an increased response. Accordingly, the sensor may be quickly prepared for working and perform accurate determination of the angular velocity with no adverse affect by ambient temperature variations.

Another advantage of the gas flow type angular velocity sensor according to the present invention is that the noise components such as pulsing gas flows due to pumping operations can be effectively eliminated in a gas-flow pulsation damping path provided between the pump and the gas path of the sensor body, whereby a stabilized gas flow is insured in the gas path of the sensor body and the gas path deflection is accurately determined without fluctuation in the sensor's output.

What is claimed is:

1. A gas flow type angular velocity sensor of the type wherein a flow of gas forced into a gas path in a sensor body through a nozzle and directed toward a pair of thermosensitive resistance elements provided in the gas path is deflected when an angular velocity is acting thereon and deflection of the gas flow is detected by the pair of thermosensitive resistance elements, characterized in that the gas path is thermostatically-controlled by a thermostatically-controlled wall which extends substantially along the entire length of a portion of the gas path up stream of the nozzle, is quickly heated by a heater, and is maintained at a constant temperature during operation of the sensor.

2. A gas flow type angular velocity sensor as claimed in claim 1, characterized in that the thermostatically-controlled portion of the gas path has a plurality of substantially parallel branches.

3. A gas flow type angular velocity sensor as claimed in claim 1, characterized in that the thermostatically-controlled portion of the gas path has a bent form, comprising a plurality of approximately ninety degree turns.

4. A gas flow type angular velocity sensor as claimed in claim 1, characterized in that the thermostatically-controlled wall has a plurality of fins projecting into the gas path.

5. A gas flow type angular velocity sensor of the type wherein resistances of two paired thermosensitive resistance elements provided in a gas path in a sensor body are changeable in accordance with a deflection of a flow of gas forced by a pump into the gas path of the sensor body through a nozzle and an angular velocity is determined from the resistance change of the thermosensitive resistance elements, characterized in that the gas path is provided with a gas-flow pulsation damping path in the sensor body.

6. A gas flow type angular velocity sensor as claimed in claim 5, characterized in that the gas-flow pulsation damping path has a bent form, comprising a plurality of approximately ninety degree turns.

7. A gas flow type angular velocity sensor as claimed in claim 5, characterized in that the gas-flow pulsation damping path comprises a plurality of fins projecting from a wall into the gas path.

8. A gas flow type angular velocity sensor of the type wherein a flow of gas forced by a pump into a gas path in a sensor body through a nozzle and directed toward a pair of thermosensitive resistance elements provided in the gas path is deflected when an angular velocity is acting thereon and deflection of the gas flow is detected by the pair of thermosensitive resistance elements, characterized in that the gas path is thermostatically-controlled by a thermostatically-controlled wall which extends substantially along the entire length of a portion of the gas path up stream of the nozzle, is quickly heated by a heater, and is maintained at a constant temperature during operation of the sensor, and in that a gas-flow pulsation damping path is provided in the sensor body in the gas path.

9. A gas flow type angular velocity sensor as claimed in claim 8, characterized in that the thermostatically-controlled portion of the gas path has a plurality of substantially parallel branches.

10. A gas flow type angular velocity sensor as claimed in claim 8, characterized in that the thermostatically-controlled portion of the gas path has a bent form, comprising a plurality of approximately ninety degree turns.

11. A gas flow type angular velocity sensor as claimed in claim 8, characterized in that the thermostatically-controlled wall has a plurality of fins projecting into the gas path.

12. A gas flow type angular velocity sensor as claimed in claim 8, characterized in that the gas-flow pulsation damping path has a bent form, comprising a plurality of approximately ninety degree turns.

13. A gas flow type angular velocity sensor as claimed in claim 8, characterized in that the gas-flow pulsation damping path comprises a plurality of fins formed on an internal wall of the sensor body, said fins projecting into the gas path.

14. A gas flow type angular velocity sensor as claimed in claim 8, characterized in that both the thermostatically-controlled gas path and the gas-flow pulsation damping path have a bent form, comprising a plurality of approximately ninety degree turns.

15. A gas flow type angular velocity sensor as claimed in claim 8, characterized in that both the thermostatically-controlled wall and the gas-flow pulsation damping path comprise a plurality of fins formed on an internal wall of the sensor body, projecting inwardly into the gas path.

* * * * *